United States Patent [19]

Idogawa et al.

[11] Patent Number: 5,965,634
[45] Date of Patent: *Oct. 12, 1999

[54] WATER BASE INK COMPOSITION

[75] Inventors: Hiroyuki Idogawa; Yasuaki Ogiwara, both of Urawa; Atsushi Iwasa, Tano-gun; Kiyokazu Sakurai, Kodama-gun, all of Japan

[73] Assignee: Mitsubishi Pencil Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/872,629

[22] Filed: Jun. 10, 1997

[30] Foreign Application Priority Data

Jun. 19, 1996 [JP] Japan ................................. 8-158455
Oct. 16, 1996 [JP] Japan ................................. 8-273337

[51] Int. Cl.⁶ ..................................................... C09D 5/00
[52] U.S. Cl. ................................................... 523/161
[58] Field of Search .......................................... 523/161

[56] References Cited

U.S. PATENT DOCUMENTS

| | | | |
|---|---|---|---|
| 4,246,154 | 1/1981 | Yao | 524/88 |
| 5,154,518 | 10/1992 | Winnik | 106/21 |
| 5,230,733 | 7/1993 | Pawlowski | 106/22 |
| 5,230,987 | 7/1993 | Kawanami | 430/284 |
| 5,489,645 | 2/1996 | Tahara | 524/817 |
| 5,514,733 | 5/1996 | Ito | 523/161 |
| 5,631,309 | 5/1997 | Yanagi | 523/160 |
| 5,789,133 | 8/1998 | Yabuuchi | 430/115 |

*Primary Examiner*—Paul R. Michl
*Attorney, Agent, or Firm*—Darby & Darby

[57] ABSTRACT

Provided is a stable water base ink composition which has a sufficiently high concentration as ink for an ink jet-recording apparatus and writing instruments and prevents the recorded images and the written characters from being blurred or disappearing with water and sweat and which has such an excellent light fastness that the images and the characters do not deteriorate over a long period of time and does not cause a change in physical properties and precipitates. A water base dispersion liquid containing colored resin fine particles is prepared by emulsion-polymerizing a vinyl monomer in the presence of a hydrophobic dye and then diluted with water or a water soluble organic solvent, whereby the water base ink composition is produced.

12 Claims, No Drawings

WATER BASE INK COMPOSITION

BACKGROUND OF THE INVENTION (1) Field of the Invention

The present invention relates to a water base ink composition, more specifically to a water base ink composition for an ink jet-recording apparatus capable of being used in an ink jet system recording apparatus which is commercially available, and a water base ink composition for writing instruments which is not blurred in writing and is useful for writing instruments such as a sign pen and a ball point pen.

(2) Description of the Prior Art

Ink compositions comprising water soluble acidic dyes or basic dyes dissolved in water base media and additives such as humidifiers, pH controllers and preservatives are known as conventional ink compositions for ink jet-recording apparatuses.

However, these ink compositions have the defects that the printed parts are blurred and the images become unclear and that since the dyes are water soluble, the recorded images are blurred or disappear with sweat and water or the colors become turbid by color mixing. Originally, water soluble dyes are inferior in light fastness and have the problem that preservation of the printed matters over a long period of time causes the images to deteriorate. Further, these ink compositions have the defects that preservation thereof over a long period of time and repeated printing cause a change in the physical properties of the inks and produce precipitates, so that nozzles are clogged or cause marked troubles in discharging to bring about inferior printing.

Dyes and pigments have so far been known as coloring components for water base inks used for writing instruments such as water base sign pens and water base ball point pens.

Inks using dyes have the defect that since the dyes are water soluble, the written characters and the drawn lines are blurred or disappear with sweat and water, so that the written characters and the drawn lines become unclear. Thus, the inks are inferior in so-called water resistance. Further, there is the problem that the dyes themselves are inferior in light fastness, so that the written characters and the drawn lines deteriorate during a long period of time.

On the other hand, inks using pigments have no problems on water resistance and light fastness but the pigments are flocculated and precipitated during a long period of time to bring about the problems such as clogging at pen points and inferior writing. In inks for writing instruments, the pigments are required to be finely dispersed, and therefore it is difficult to disperse various organic pigments to increase the color number of the inks.

SUMMARY OF THE INVENTION

A subject of the present invention is to solve the defects and the problems of the preceding conventional ink compositions for an ink jet-recording apparatus. An object of the present invention is to provide a stable water base ink composition which has a sufficiently high concentration for ink jet recording and gives such a sharp image that a printed part is not blurred, in which the recorded images are prevented from being blurred or disappearing with sweat and water and the colors do not become turbid by color mixing, which has such an excellent light fastness that the images do not deteriorate even after storing the printed matters over a long period of time and which does not cause a change in physical properties and does not produce precipitates.

Further, another subject of the present invention is to solve the defects and the problems of the preceding conventional water base inks for writing instruments, and another object of the present invention is to provide a stable water base ink composition which provides such sharp characters and drawn lines that they are prevented from being blurred or disappearing with water and sweat and has such an excellent light fastness that the characters and the drawn lines do not deteriorate over a long period of time and which does not produce precipitates.

Various investigations continued by the present inventors in order to solve the problems described above have resulted in successfully obtaining a water base ink composition solving the problems described above by using a liquid obtained by emulsion-polymerizing a vinyl monomer dissolving a hydrophobic dye, and thus coming to complete the present invention.

According to one aspect of the present invention, provided is a water base ink composition comprising a water base dispersion liquid containing colored resin fine particles which are prepared by emulsion-polymerizing a vinyl monomer dissolving a hydrophobic dye in the presence of a polymerizable surfactant.

According to another aspect of the present invention, provided is a water base ink composition comprising a water base dispersion liquid containing colored resin fine particles which are prepared by emulsion-polymerizing a vinyl monomer dissolving a hydrophobic dye in the presence of a polymerizable surfactant, wherein a content of the water base dispersion liquid containing the colored resin fine particles is 3 to 30% by weight (in terms of a resin solid content); a content of a water soluble organic solvent is 10 to 80% by weight; and a content of water is 30 to 90% by weight based on the whole amount of the ink composition.

The colored resin fine particles described above have preferably a particle diameter of 0.5 $\mu$m or less. The water base ink composition of the present invention is effectively used for ink jet recording apparatuses or writing instruments.

It is noted that the water base dispersion liquid containing the colored resin fine particles is a colored emulsion polymerization liquid obtained by emulsion-polymerizing the vinyl monomer dissolving the hydrophobic dye in the presence of the polymerizable surfactant.

Further advantages and features of the present invention as well as the scope, nature and utilization of the present invention shall become apparent to those skilled in the art from the description of the preferred embodiments of the present invention set forth below.

DESCRIPTION OF THE PREFERRED EMBODIMENTS

The water base dispersion liquid containing the colored resin fine particles having a particle diameter of 0.5 $\mu$m or less related to the water base ink composition of the present invention is prepared by emulsion-polymerizing a vinyl monomer dissolving a hydrophobic dye with ammonium persulfate, potassium persulfate or hydrogen peroxide used as a polymerization initiator or if necessary, a reducing agent used in combination as the initiator in the presence of a polymerizable surfactant.

In order to prepare a water base ink composition for ink jet-recording apparatuses or writing instruments from the water base dispersion liquid (usually, obtained in the form of a concentrated liquid having a resin solid content of 20 to 50% by weight) containing the colored resin fine particles thus obtained, the water base dispersion liquid is diluted with water and a water soluble organic solvent to adjust the resin solid content (resin fine particles) to 3 to 30% by weight based on the water base ink composition.

Usually, the water base dispersion liquid containing the colored resin fine particles related to the water base ink composition of the present invention is not flocculated or precipitated, and when it is used as an ink composition for ink jet-recording apparatuses or writing instruments in which a higher stability is required, the colored resin fine particles have preferably a particle diameter of 0.5 μm or less. Further, also in order to prevent clogging when the ink composition passes through a narrow nozzle or a fine pen point such as a felt pen, the colored resin fine particles have preferably a particle diameter of 0.5 μm or less.

The vinyl monomer used for preparing the water base dispersion liquid containing the colored resin fine particles related to the water base ink composition of the present invention shall not specifically be restricted, and one or more monomers are selected from among hydrophobic monomers including acrylates such as methyl acrylate, ethyl acrylate, n-propyl acrylate and n-butyl acrylate, methacrylates such as methyl methacrylate, ethyl methacrylate, n-propyl methacrylate and n-butyl methacrylate, vinyl esters such as vinyl acetate, vinyl propionate, vinyl butyrate, vinyl benzoate and vinyl salicylate, olefins such as butadiene, isoprene and propylene, and styrenes such as styrene and methylstyrene to use them for emulsion-polymerization. Further, hydrophilic monomers having hydrophilic functional groups such as an amino group, a carboxyl group, a sulfone group, an amide group and a hydroxyl group may be blended as long as the emulsion-polymerization is not inhibited, preferably in a proportion of less than 50% by weight (based on the whole amount of the vinyl monomer). Further, monomers having reactive cross-linking groups such as an epoxy group, a hydroxymethylamide group and an isocyanate group and multifunctional monomers having two or more vinyl groups may be blended as a cross-linking agent.

The polymerizable surfactant used for preparing the water base dispersion liquid containing the colored resin fine particles related to the water base ink composition of the present invention shall not specifically be restricted as long as it has a vinyl group and a surface (interface) activity and shall not be restricted as well in ionicity such as anion, cation and nonion. Included are, for example, "Adekalia Soap NE-10", "Adekalia Soap NE-20", "Adekalia Soap NE-30", "Adekalia Soap NE-40" and "Adekalia Soap SE-10N", which has the formula

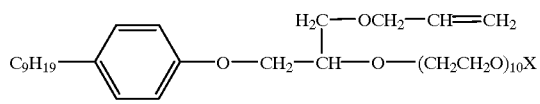

where X is $SO_3NH_4$, each manufactured by Asahi Denka Ind. Co., Ltd., and "Latemul S-180", "Latemul S-180A" and "Latemul S-120A" each manufactured by Kao Corporation. Among them, one or more surfactants are used in combination. The use amount of the polymerizable surfactant is preferably 0.1 to 50% by weight based on the whole amount of the vinyl monomer.

The hydrophobic dye used for preparing the water base dispersion liquid containing the colored resin fine particles related to the water base ink composition of the present invention includes preferably monoazo group, anthraquinone group, metal complex salt type monoazo group, diazo group, phthalocyanine group and triallylmethane group, and these hydrophobic dyes are dissolved in many organic solvents other than water. Included are, for example, "DIARESIN YELLOW C" [CI Solvent Yellow 103] and "DIARESIN YELLOW A" each manufactured by Mitsubishi Chemical Co., Ltd., "ORIENT OIL SCARLET #308" [CI Solvent Red 18] manufactured by Orient Chemical Ind. Co., Ltd., "AIZEN SPILON BLUE 2BNH" [CI Solvent Blue 117] and "AIZEN SPILON BLUE GNH" each manufactured by Hodogaya Chemical Ind. Co., Ltd., and "VALI FAST BLACK #3840" [CI Solvent Black 27] and "VALI FAST BLACK #1802" each manufactured by Orient Chemical Ind. Co. The blend amount of the dye in the emulsion-polymerization falls in a range of 0.2 to 50% by weight based on the whole amount of the monomers.

The water soluble organic solvent used for the water base ink composition of the present invention includes alkylene glycols such as ethylene glycol, triethylene glycol, tetraethylene glycol, dipropylene glycol, 1,2-propanediol, 1,3-propanediol, 1,2-butanediol, 2,3-butanediol, 1,3-butanediol, 1,4-butanediol, 1,2-pentanediol, 1,5-pentanediol, 2,5-hexanediol, 3-methyl-1,3-butanediol, 2-methylpentane-2,4-diol, 3-methylpentane-1,3,5-triol, 1,2,3-hexanetriol and glycerin, polyalkylene glycols such as polyethylene glycol and polypropylene glycol, glycerols such as glycerol, diglycerol and triglycerol, lower alkyl ethers of glycols such as ethylene glycol monomethyl ether, ethylene glycol monoethyl ether, diethylene glycol monomethyl ether, diethylene glycol monoethyl ether and diethylene glycol mono-n-butyl ether, thiodiethanol, N-methyl-2-pyrrolidone and 1,3-dimethyl-2-imidalidinone. The content thereof is preferably 10 to 80% by weight, more preferably 10 to 60% by weight based on the whole amount of the ink composition.

In addition thereto, there can be mixed, for example, water soluble solvents including alcohols such as methyl alcohol, ethyl alcohol, isopropyl alcohol, n-butyl alcohol, tert-butyl alcohol, isobutyl alcohol, hexyl alcohol, octyl alcohol, nonyl alcohol, decyl alcohol and benzyl alcohol, amides such as dimethylformamide and diethylacetamide, and ketones such as acetone.

The content of water is preferably 30 to 90% by weight, more preferably 40 to 60% by weight based on the whole amount of the ink composition. In addition thereto, preservatives, pH controllers, activators, lubricants, defoamers, rust preventives and the like can suitably be selected and used if necessary.

The pH controller includes, for example, ammonia, urea, monoethanolamine, diethanolamine, triethanolamine, alkali metal salts of carbonic acid and phosphoric acid such as sodium tripolyphosphate and sodium carbonate, and hydroxides of alkali metals such as sodium hydroxide.

The preservative or fungicide includes phenol, sodium omadine, sodium pentachlorophenate, 1,2-benzoisothiazoline-3-one, 2,3,5,6-tetrachloro-4-(methylphonyl)pyridine, alkali metal salts of benzoic acid, sorbic acid and dehydroacetic acid, and benzimidazole group compounds.

The lubricant includes polyalkylene glycol derivatives such as polyoxyethylene lauryl ether, fatty acid alkali salts, nonionic surfactants, fluorine surfactants such as perfluoroalkylphosphoric esters, and polyether-modified silicones such as polyethylene glycol adduct of dimethylpolysiloxane.

The water base dispersion liquid containing the colored resin fine particles related to the water base ink composition of the present invention is obtained from an emulsion-polymerization liquid obtained by carrying out emulsion polymerization in the presence of the polymerizable surfactant, so that surface active substances are scarcely present in a water base medium as compared with dispersion liquids obtained by using conventional surfactants. Accordingly, it has a high surface tension (usually, 40 dyn/cm or more). That makes it possible not only to obtain sharp images which are not blurred at printed parts when the water base dispersion liquid of the present invention containing the colored resin fine particles is used as an ink composition for an ink jet recording apparatus but also to obtain a water resistant coating in which images are prevented from being blurred or disappearing with water and sweat. On the other hand, when the water base dispersion liquid of the present invention containing the colored resin fine particles is used as an ink composition for writing instruments, the characters and the drawn lines are clear and are not blurred or do not disappear with water or sweat, and the water resistant drawn line coating is formed.

The resin fine particles are colored by dissolving the hydrophobic dye in the vinyl monomer in advance and then emulsion-polymerizing the monomer, whereby the resin fine particles come to present a vivid color. When the water base dispersion liquid containing the colored resin fine particles thus obtained is used as a water base ink composition for an ink jet-recording apparatus, the sharp images in which the printed parts are not blurred can be obtained, and it is possible as well to provide an excellent ink in which the images are prevented from being blurred or disappearing with water and sweat and the colors do not become turbid by color mixing. Further, it is possible to provide an ink which has such an excellent light fastness that the images are not deteriorated even after storing the printed matters over a long period of time. When the water base ink composition of the present invention is used as an ink for writing instruments, it is possible to provide an excellent ink capable of writing characters and lines which are sharp and are not blurred or do not disappear with water and sweat. Usually, the use amount of the dye falls in a range of 0.2 to 50% by weight based on the whole amount of the vinyl monomer.

The colored resin fine particles related to the water base ink composition of the present invention are not substantially dissolved in water. In the water base ink composition of the present invention, the colored resin fine particles are characterized by that they are prepared by emulsion-polymerizing the vinyl monomer dissolving the hydrophobic dye in the presence of the polymerizable surfactant.

EXAMPLES

The water base ink composition of the present invention shall be explained below in further detail with reference to examples and comparative examples, wherein the water base ink compositions of the present invention have been applied to an ink jet-recording apparatus.

The performances in the respective examples were tested by the following methods.

Blur:
The degree of blur in the characters printed on a PPC copy paper was judged with naked eyes:
○: not blurred
Δ: slightly blurred
x: blurred Water Resistance:
The characters printed on a PPC copy paper were dipped in water for one hour to judge the degree of blur with naked eyes:

○: not blurred
Δ: slightly blurred
x: blurred

Light Fastness:
The characters printed on a PPC copy paper were irradiated with a fade meter for 20 hours to judge if fading was observed.

Storage Stability:
A cartridge charged with the ink composition was put in a constant temperature bath of 50° C. to determine days required until printing was impossible.

Particle diameter, viscosity and surface tension were determined by the following methods.

Particle Diameter:
The particle diameter of the colored resin fine particle was determined by means of a laser scattering type particle size distribution analyzer (coulter counter, model N4SD manufactured by Nikkiso Co., Ltd.).

Viscosity:
The viscosity of the water base dispersion liquid containing the colored resin fine particles was determined by means of a corn plate type rotational viscometer (ELD type manufactured by Tokyo Keiki Co., Ltd.), wherein the measuring temperature was 25° C.

Surface Tension:
The surface tension of the water base dispersion liquid containing the colored resin fine particles was determined by a hanging plate method, wherein the measuring temperature was 25° C.

Example 1

A 2 liter flask equipped with a stirrer, a reflux condenser, a thermometer, a nitrogen gas-introducing tube and a 500 ml separating funnel for charging a monomer was set in a hot water bath and charged with 500 g of distilled water. Then, the inner temperature was elevated up to 80° C. while introducing nitrogen gas.

On the other hand, a vinyl monomer mixture comprising 250 g of methyl methacrylate, 200 g of n-butyl methacrylate and 50 g of methacrylic acid, 10 g of an oil soluble red dye (ORIENT OIL SCARLET #308 manufactured by Orient Chemical Ind. Co., Ltd.), 250 g of distilled water, and 20 g of a polymerizable surfactant (Adekalia Soap SE-10N manufactured by Asahi Denka Ind. Co., Ltd.) were mixed and stirred to disperse them. Further, 1 g of ammonium persulfate was dissolved therein to prepare a mixed solution.

This mixed solution was added into the flask maintained at temperatures of about 80° C. from the separating funnel described above over a period of 3 hours while stirring, and the polymerization was finished in 5 hours to obtain a water base dispersion liquid containing red resin fine particles.

Distilled water of 3000 g and propylene glycol of 1000 g were added to this water base dispersion and stirred to homogeneity, whereby a red ink composition having a viscosity of 2.8 cp and a surface tension of 54 dyn/cm was obtained.

The colored resin fine particles contained in the red ink composition had a particle diameter of 0.20 μm. The red ink composition was excellent in water resistance and light fastness in terms of characteristics and presented a vivid red color without causing blur and clogging.

Example 2

A 2 liter flask equipped with a stirrer, a reflux condenser, a thermometer, a nitrogen gas-introducing tube and a 500 ml separating funnel for charging a monomer was set in a hot water bath and charged with 500 g of distilled water. Then, the inner temperature was elevated up to 80° C. while introducing nitrogen gas.

On the other hand, a monomer mixture comprising 200 g of styrene, 200 g of n-butyl methacrylate and 100 g of acrylic acid, 15 g of an oil soluble blue dye (AIZEN SPILON BLUE 2BNH manufactured by Hodogaya Chemical Ind. Co., Ltd.), 250 g of distilled water, and 10 g of a polymerizable surfactant (Latemul S-180 manufactured by Kao Corporation) were mixed and stirred to disperse them. Further, 2 g of ammonium persulfate was dissolved therein to prepare a mixed solution.

This mixed solution was added into the flask maintained at temperatures of about 80° C. from the separating funnel described above over a period of 3 hours while stirring, and the polymerization was finished in 5 hours to obtain a water base dispersion liquid containing blue resin fine particles.

Distilled water of 3000 g and propylene glycol of 1000 g were added to this water base dispersion liquid and stirred to homogeneity, whereby a blue ink composition having a viscosity of 3.2 cp and a surface tension of 52 dyn/cm was obtained.

The colored resin fine particles contained in the blue ink composition had a particle diameter of 0.24 μm. The blue ink composition was excellent in water resistance and light fastness in terms of characteristics and presented a vivid blue color without causing blur and clogging.

Comparative Example 1

A red ink composition was obtained by mixing 25 g of a water soluble acrylic resin [JONCRYL 61J (solid content: 30%) manufactured by Johnson Polymer Co., Ltd.], 2 g of a water soluble red dye (AIZEN CATHILON PINK FGH manufactured by Hodogaya Chemical Ind. Co., Ltd.), 10 g of propylene glycol and 63 g of distilled water and stirring for one hour to dissolve them.

Comparative Example 2

A blue ink composition was obtained by mixing 1 g of a water soluble blue dye (AIZEN VICTORIA PURE BLUE BOH manufactured by Hodogaya Chemical Ind. Co., Ltd.), 10 g of propylene glycol and 89 g of distilled water and stirring for one hour to dissolve them.

Comparative Example 3

A red ink composition was produced in the same conditions as in Example 1, except that 20 g of the polymerizable surfactant (Adekalia Soap SE-10N manufactured by Asahi Denka Ind. Co., Ltd.) was changed to a surfactant comprising 5 g of sodium dodecylbenzenesulfonate and 5 g of polyoxyethylene nonylphenyl ether.

This red ink composition had a viscosity of 3.1 cp and a surface tension of 37 dyn/cm. The colored resin fine particles contained in the ink composition had a particle diameter of 0.25 μm. Comparative Example 4

The emulsion polymerization was carried out in the same conditions as in Example 1, except that the oil soluble dye was not dissolved in the monomer mixture, whereby a water base dispersion liquid containing non-colored resin fine particles was obtained.

Then, 5 g of the water soluble red dye (AIZEN CATHILON PINK FGH manufactured by Hodogaya Chemical Ind. Co., Ltd.), 3000 g of distilled water and 1000 g of propylene glycol were added to this water base dispersion liquid and stirred to homogeneity, whereby a red ink composition was obtained.

The results obtained in the respective examples and comparative examples are shown in Table 1.

TABLE 1

|  | Example | | Comparative Example | | | |
| --- | --- | --- | --- | --- | --- | --- |
|  | 1 | 2 | 1 | 2 | 3 | 4 |
| Blur | ○ | ○ | Δ | x | Δ | Δ |
| Water resistance | ○ | ○ | x | x | Δ | Δ |
| Light fastness | Excellent | Excellent | Inferior | Inferior | Excellent | Inferior |
| Storage stability | More than 180 days | More than 180 days | More than 180 days | More than 180 days | More than 180 days | Solidified after 45 days |

The water base ink composition of the present invention shall be explained below in further detail with reference to examples and comparative examples, wherein the water base ink compositions of the present invention have been applied to writing instruments.

The performances in the respective examples were tested by the following methods.
Blur:
  The degree of blur in the characters written on a writing paper was judged with naked eyes:
    ○: not blurred
    Δ: slightly blurred
    x: blurred
Water Resistance:
  The characters written on a writing paper were dipped in water for one hour to judge the degree of blur with naked eyes:
    ○: not blurred
    Δ: slightly blurred
    x: blurred
Light Fastness:
  The characters written on a writing paper were irradiated with a fade meter for 20 hours to judge if fading was observed.
Storage Stability:
  A water base sign pen cartridge was charged with the ink composition and put in a constant temperature bath of 50° C. to determine days required until printing was impossible.
Particle Diameter:
  The particle diameter of the colored resin fine particle was determined by means of the laser scattering type particle size distribution analyzer (coulter counter, model N4SD manufactured by Nikkiso Co., Ltd.).

Viscosity:

The viscosity of the ink composition was determined by means of the corn plate type rotational viscometer (ELD type manufactured by Tokyo Keiki Co., Ltd.), wherein the measuring temperature was 25° C.

Surface Tension:

The surface tension of the ink composition was determined by the hanging plate method, wherein the measuring temperature was 25° C.

Example 3

A 2 liter flask equipped with a stirrer, a reflux condenser, a thermometer, a nitrogen gas-introducing tube and a 500 ml separating funnel for charging a monomer was set in a hot water bath and charged with 500 g of distilled water. Then, the inner temperature was elevated up to 80° C. while introducing nitrogen gas.

On the other hand, 8 g of the oil soluble red dye (ORIENT OIL SCARLET #308 manufactured by Orient Chemical Ind. Co., Ltd.), 250 g of distilled water and 20 g of a polymerizable surfactant (Adekalia Soap SE-10N manufactured by Asahi Denka Ind. Co., Ltd.) were mixed with 500 g of a monomer mixture comprising 250 g of methyl methacrylate, 200 g of n-butyl methacrylate and 50 g of methacrylic acid and stirred to disperse them. Further, 1 g of ammonium persulfate was dissolved therein to prepare a mixed solution.

This mixed solution was added into the flask maintained at temperatures of about 80° C. from the separating funnel described above in 3 hours while stirring, and the polymerization was finished in 5 hours to obtain a water base dispersion liquid containing colored resin fine particles.

Distilled water of 3000 g and propylene glycol of 1000 g were added to the water base dispersion liquid thus obtained containing the colored resin fine particles and stirred to homogeneity, whereby a red ink composition having a viscosity of 2.8 cp and a surface tension of 54 dyn/cm was obtained.

A pen using the red ink composition thus obtained did not cause clogging. The written characters had excellent water resistance and light fastness and presented a vivid red color without causing blur. The colored resin fine particles contained in the composition had a particle diameter of 0.15 $\mu$m.

Example 4

A 2 liter flask equipped with a stirrer, a reflux condenser, a thermometer, a nitrogen gas-introducing tube and a 500 ml separating funnel for charging a monomer was set in a hot water bath and charged with 500 g of distilled water. Then, the inner temperature was elevated up to 80° C. while introducing nitrogen gas.

On the other hand, 500 g of a monomer mixture comprising 200 g of styrene, 200 g of methyl methacrylate and 100 g of acrylic acid, 8 g of an oil soluble blue dye (AIZEN SPILON BLUE GNH manufactured by Hodogaya Chemical Ind. Co., Ltd.), 250 g of distilled water, and 10 g of a polymerizable surfactant (Latemul S-180 manufactured by Kao Corporation) were mixed and stirred to disperse them. Further, 2 g of ammonium persulfate was dissolved therein to prepare a mixed solution.

This mixed solution was added into the flask maintained at temperatures of about 80° C. from the separating funnel described above over a period of 3 hours while stirring, and the polymerization was finished in 5 hours to obtain a water base dispersion liquid containing colored resin fine particles.

Distilled water of 3000 g and propylene glycol of 1000 g were added to the water base dispersion liquid thus obtained containing the colored resin fine particles and stirred to homogeneity, whereby a blue ink composition having a viscosity of 3.2 cp and a surface tension of 52 dyn/cm was obtained.

A pen using the blue ink composition thus obtained did not cause clogging. The written characters had excellent water resistance and light fastness and presented a vivid blue color without causing blur. The colored resin fine particles contained in the ink composition had a particle diameter of 0.16 $\mu$m.

Comparative Example 5

A red ink composition was obtained by mixing 25 g of a styrene-maleic acid resin [SMA-1440H (solid content: 26%) manufactured by Arco Chemical Co., Ltd.], 2 g of a water soluble red dye (AIZEN CATHILON PINK FGH manufactured by Hodogaya Chemical Ind. Co., Ltd.), 20 g of propylene glycol and 53 g of distilled water and stirring for one hour to dissolve them.

Comparative Example 6

A blue ink composition was obtained by mixing 1 g of a water soluble blue dye (AIZEN VICTORIA PURE BLUE BOH manufactured by Hodogaya Chemical Ind. Co., Ltd.), 20 g of propylene glycol and 79 g of distilled water and stirring for one hour to dissolve them.

Comparative Example 7

A red ink composition was obtained in the same conditions as in Example 3, except that 20 g of the polymerizable surfactant (Adekalia Soap SE-10N manufactured by Asahi Denka Ind. Co., Ltd.) was changed to a surfactant (5 g of sodium dodecylbenzenesulfonate and 5 g of polyoxyethylene nonylphenyl ether).

The red ink composition thus obtained had a viscosity of 3.1 cp and a surface tension of 37 dyn/cm. The colored resin fine particles contained in the ink composition had a particle diameter of 0.14 $\mu$m.

Comparative Example 8

The emulsion polymerization was carried out in the same conditions as in Example 3, except that the oil soluble dye was not dissolved in the monomer mixture, whereby a water base dispersion liquid containing non-colored resin fine particles was obtained.

Then, 5 g of the water soluble red dye (AIZEN CATHILON PINK FGH manufactured by Hodogaya Chemical Ind. Co., Ltd.), 3000 g of distilled water and 1000 g of propylene glycol were added and stirred to homogeneity, whereby a red ink composition was obtained.

The results obtained in the respective examples and comparative examples are shown in Table 2.

TABLE 2

| | Example | | Comparative Example | | | |
|---|---|---|---|---|---|---|
| | 3 | 4 | 5 | 6 | 7 | 8 |
| Blur | ○ | ○ | Δ | x | Δ | Δ |
| Water resistance | ○ | ○ | x | x | Δ | Δ |
| Light fastness | Excellent | Excellent | Inferior | Inferior | Excellent | Inferior |
| storage stability | More than 180 days | More than 180 days | More than 180 days | More than 180 days | More than 180 days | Impossible to write after 45 days |

As described above in detail, the ink compositions of the present invention have an excellent storage stability. Ink-jet recording obtained by using the water base ink composition of the present invention for an ink jet-recording apparatus provides sharp images without causing blur at the printed parts and is excellent in water resistance and light fastness. Written characters and drawn lines obtained by using the water base ink composition of the present invention for writing instruments are prevented from being blurred and disappearing with water and sweat and do not become turbid by color mixing. They are so sharp and not blurred. Further, the written characters and the drawn lines have such excellent water resistance and light fastness that they do not deteriorate even after leaving for standing over a long period of time.

Since the water base dispersion liquid of the present invention containing the colored resin fine particles is a colored emulsion-polymerized liquid obtained by emulsion-polymerizing a vinyl monomer dissolving a hydrophobic dye in advance, it presents a vivid color and does not cause the pigment to flocculate or precipitate over a long period of time.

What is claimed is:

1. A water base ink composition, comprising a water base dispersion liquid, having a surface tension of at least 40 dyn/cm, comprising colored resin fine particles wherein said liquid is prepared by emulsion polymerizing a vinyl monomer in the presence of a hydrophobic dye and a polymerizable surfactant, said polymerizable surfactant having the formula

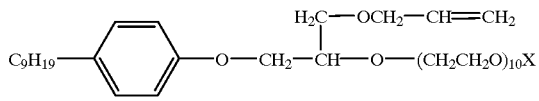

wherein X is $SO_3NH_4$.

2. The water base ink composition as described in claim 1, wherein said colored resin fine particles have a particle diameter of 0.5 μm or less.

3. A water base ink composition, comprising a water base dispersion liquid comprising colored resin fine particles wherein said liquid is prepared by emulsion polymerizing a vinyl monomer in the presence of a hydrophobic dye and a polymerizable surfactant, said polymerizable surfactant having the formula

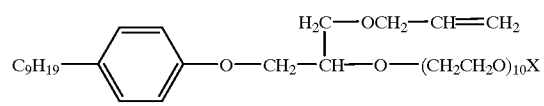

wherein X is $SO_3NH_4$, said liquid comprises 3 to 30% by weight resin solid content of the colored resin fine particles; 10 to 80% by weight water soluble organic solvent; and 30 to 90% by weight water based on the amount of the water base ink composition.

4. The water base ink composition as described in claim 3, wherein said colored resin fine particles have a particle diameter of 0.5 μm or less.

5. The water base ink composition for an ink jet-recording apparatus as described in claim 1.

6. The water base ink composition for an ink jet-recording apparatus as described in claim 2.

7. The water base ink composition for an ink jet-recording apparatus as described in claim 3.

8. The water base ink composition for an ink jet-recording apparatus as described in claim 4.

9. The water base ink composition for writing instruments as described in claim 1.

10. The water base ink composition for writing instruments as described in claim 2.

11. The water base ink composition for writing instruments as described in claim 3.

12. The water base ink composition for writing instruments as described in claim 4.

* * * * *